United States Patent

Barks

[15] 3,638,968
[45] Feb. 1, 1972

[54] FAUCET ADAPTER

[72] Inventor: Robert W. Barks, 112 Washington St., Delaware City, Del. 19706

[22] Filed: Aug. 21, 1969

[21] Appl. No.: 851,979

[52] U.S. Cl. ................................................. 285/8, 285/328
[51] Int. Cl. ................................... E03c 1/00, F16l 21/00
[58] Field of Search ................................. 285/8, 328, 293

[56] References Cited

UNITED STATES PATENTS

| 1,985,502 | 12/1934 | Isenberg | 285/8 X |
| 2,326,479 | 8/1943 | Mejdrich | 285/8 |
| 2,711,331 | 6/1955 | Temple | 285/8 |
| 2,874,981 | 2/1959 | Brady | 285/328 X |
| 3,325,195 | 6/1967 | Margis | 285/328 X |

FOREIGN PATENTS OR APPLICATIONS

| 336,076 | 10/1930 | Great Britain | 285/293 |
| 543,303 | 2/1942 | Great Britain | 285/169 |

Primary Examiner—Dave W. Arola
Attorney—Morton, Bernard, Brown, Roberts & Sutherland

[57] ABSTRACT

This invention relates to a faucet adapter device for flexibly connecting a pliant hose to a rigid faucet. The device includes a flexible tube having at one end a fastener made of elongated strips of flexible material which is wound around the joint between the device and a rigid faucet and secured in place. Affixed at the other end of the device is a rigid hose-threaded male coupling adapter for connection with a corresponding female structure located on the end of a pliant hose.

4 Claims, 8 Drawing Figures

PATENTED FEB 1 1972
3,638,968
FIG.1. FIG.2. FIG.4. FIG.3. FIG.5. FIG.6. FIG.7. FIG.8.
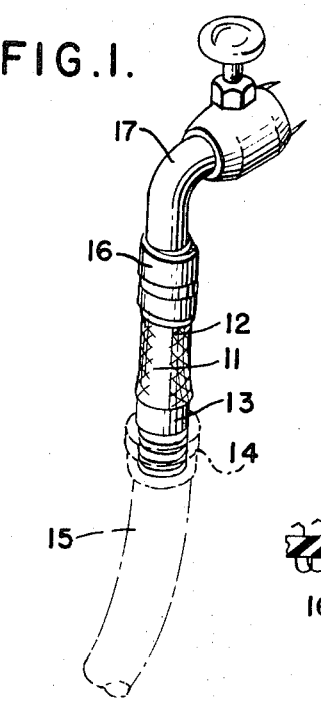
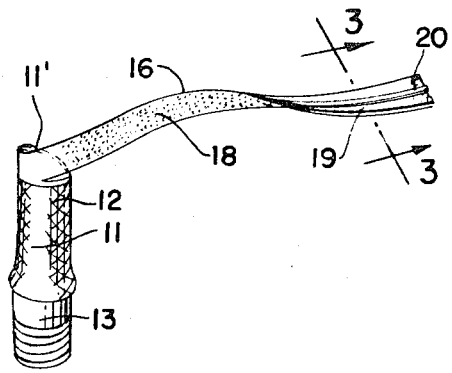
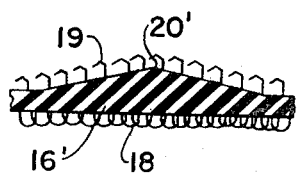
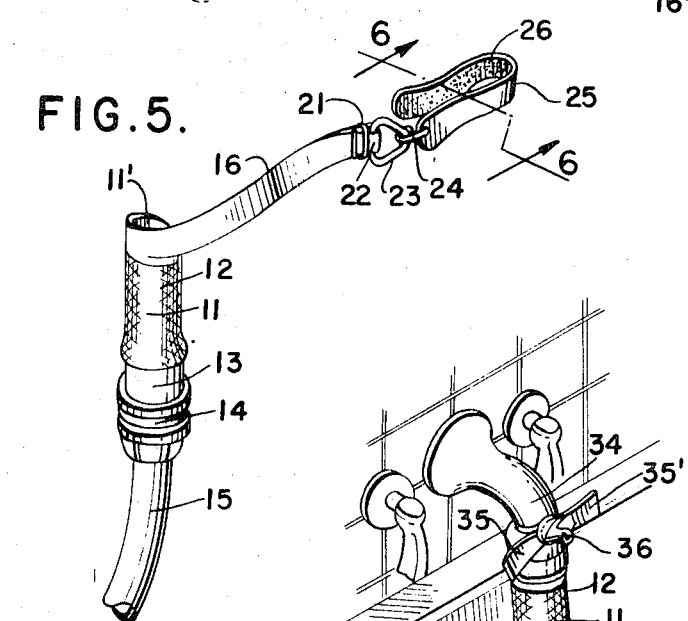
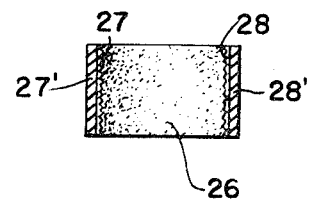
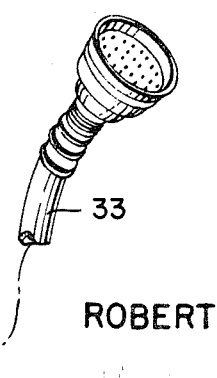
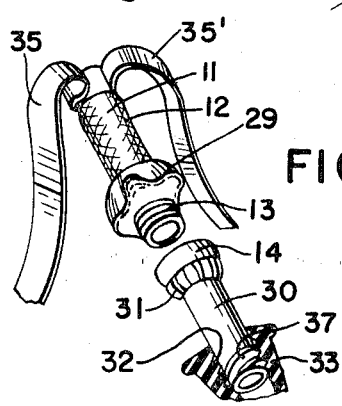
INVENTOR
ROBERT W. BARKS
BY McLean, Morton & Boustead
ATTORNEYS

FAUCET ADAPTER

The invention also relates to the use of the faucet adapter device in combination with a rubber hose stub that can be joined at one end to the faucet adapter device by means of a rotatable female hose-threaded coupling adapter, and spirally connected by threads adjacent its other end to an open, threaded, rubber female end of a shower hose.

BACKGROUND OF THE INVENTION

1. Field of the Invention

This invention involves interstitial devices for connecting flexible tubular hoses to rigid tubular fixtures. More particularly, the invention is directed to a reinforced flexible tubular adapter device which provides a flexible, secure, leakproof means of connecting flexible tubular hoses to rigid faucets.

2. Description of the Prior Art

At the present time there is lacking effective means of convertibly connecting a flexible hose to a rigid faucet. Devices available either are so rigid as to deny desired hose pliancy or so flexible as to cause leakage or disengagement of the device from the faucet when fluid is being transported and when the hose is cramped or flexed. Witness, as one example, the lack of adequate means of connecting a bathtub shower spray hose to a bathtub faucet. Also, the devices that are available cannot be easily and quickly installed or removed from faucets of various sizes and shapes.

The flexible tubular device of the present invention is advantageous in that it is adaptable at one end to securely fit over and be fastened to faucets of various sizes, and adaptable at the other end for connection with various pliable hoses. The connection provided does not leak nor does the adapter device become disengaged from the rigid faucet when fluid is being transported and the flexible hose is bent or moved. The device can easily and quickly be installed or removed from faucets of various sizes and shapes.

BRIEF SUMMARY OF THE INVENTION

The device of the present invention is a faucet adapter device for flexibly connecting a pliable hose to a rigid faucet which comprises in combination a reinforced flexible tubular means for transporting fluid between a rigid faucet and a pliable hose, said reinforced flexible tubular means having affixed adjacent one of its open ends, a rigid hose-threaded male coupling adapter for connection with a corresponding female structure located on the end of a pliant hose.

Briefly, the device operates in the following manner: The hose-threaded coupling adapter at one end of the device is connected to a corresponding coupling adapter on a pliable hose. The mouth of the other end of the tubular device is fitted over a faucet and fasteners are wound around the joint between the adapter device and the faucet. The fasteners act as gaskets sealing the joint because either their inner surfaces are tapered to form a raised middle ridge, or they have affixed to them a narrow elongated strip of flexible material which runs lengthwise along the middle of the fastener. The fasteners secure the adapter to the faucet and are fastened and prevented from slipping by either interengaging hook and loop nylon gripping material affixed to the inner and outer surfaces of the fasteners, or by a coarse, gritty material covering the inner surface of the last few turns of each fastener and a coarse, gritty material coated to the inner surface of a C-clamp clasping device that is clamped over the fasteners wound around the faucet.

The device can be used in combination with a rubber hose stub for connecting a shower spray hose or other flexible hose to a faucet. A hose-threaded coupling adapter on one end of the rubber hose stub is connected to a faucet adapter device which is fastened to a faucet. The threaded end of the rubber hose stub faucet adapter is then screwed into the threaded female open end of a flexible hair spray or shower hose.

BRIEF DESCRIPTION OF DRAWING

In the drawing:

FIG. 1 shows a faucet adapter device attached to a flexible hose and fastened to a faucet.

FIG. 2 is the disengaged faucet adapter device of FIG. 1.

FIG. 3 is a planar view taken at cross section 3 of FIG. 2.

FIG. 4 is a planar view that might be taken at cross section 3 showing a variation of the fastener of FIG. 2.

FIG. 5 is a faucet adapter device having its faucet adapter fastener attached to a C-clamp fastener.

FIG. 6 is a planar view taken at cross section 6 of FIG. 5 showing the coarse, gritty coating on the inside of the C-clamp clasping device.

FIG. 7 shows a faucet adapter device tied at one end to a faucet and fastened at the other end to a rubber hose stub in turn fastened to a shower hose.

FIG. 8 is the disconnected faucet adapter device and rubber hose stub of FIG. 7 showing the latter connected to the open end of a shower hose.

DETAILED DESCRIPTION OF THE INVENTION

Referring now to the Figures in detail, FIG. 1 specifically shows a faucet adapter device comprising in combination a flexible tubular means 11 reinforced by netted sleeve 12, a rigid hose-threaded male coupling adapter 13 spirally connected to a corresponding rotatable female hose-threaded coupling adapter 14 affixed to an open end of a flexible hose 15, and, finally, a faucet adapter fastener 16 which is wound around and fastened to a conventional faucet 17.

FIG. 2 is the faucet adapter device of FIG. 1 showing flexible tubular means 11 reinforced by netted sleeve 12, flexible tubular opening 11', and rigid hose-threaded male coupling adapter 13 affixed adjacent an open end of flexible tubular means 11. Faucet adapter fastener 16 is shown having nylon loops 18 on its outer surface, and nylon hooks 19 and compressible sealer 20 on its inside surface.

FIG. 3 is a planar view taken of cross section 3 of FIG. 3 showing faucet adapter fastener 16 with nylon loops 18 affixed to its outside surface and nylon hooks 19 and compressible sealer 20 affixed to its inside surface.

FIG. 4 is a planar view that might be taken at cross section 3 of FIG. 2 showing another embodiment of a faucet adapter fastener, here designated 16', this one having a middle ridge 20' running lengthwise and parallel to the edges of the fastener, nylon loops 18 affixed to the outside surface of fastener 16' and nylon hooks 19 affixed to its inner surface.

FIG. 5 shows another variation of the faucet adapter device. Specifically, it shows flexible tubular means 11 reinforced by netted sleeve 12, and adjacent flexible tubular opening 11', a rigid hose-threaded male coupling adapter 13 connected to a corresponding rotatable female hose-threaded coupling adapter 14 affixed to flexible hose 15. Faucet adapter fastener 16 is shown attached by tying means 21, triangular link 23 in fastener loop 22, and oval link 24, to C-clamp clasping device 25 which is coated on its inside surface with a coarse, gritty material 26.

FIG. 6 is a planar view taken at cross section 6 of FIG. 5 showing coarse, gritty material 26 on the inside surface of the curve of C-clamp clasping device 25 and the coarse, gritty material 27 and 28 on the inside surfaces of sides 27' and 28'.

FIG. 7 shows another embodiment of the faucet adapter device comprising a flexible tubular means 11 reinforced by netted sleeve 12, flexible tubular opening 11', knobbed handle means 29, and a rigid male hose-threaded coupling adapter 13 connected to a corresponding rotatable hose-threaded female coupling adapter 14 that is attached to one end of rubber hose stub 30 by means of a depressed connecting collar 31. Rubber hose stub 30 is connected to the threaded open female receiving end 32 of shower hose 33. The faucet adapter device shown in combination with rubber hose stub 30 is fastened to faucet 34 by means of faucet adapter fasteners 35 and 35' which are wrapped in opposite directions around the joint between the faucet adapter device and faucet 34 and tied in a knot 36.

FIG. 8 shows the disconnected, faucet adapter device and rubber hose stub that is shown in combination in FIG. 7. Specifically, it shows a faucet adapter device comprised of flexible tubular means 11 reinforced by netted sleeve 12, knobbed handle means 29, and rigid hose-threaded male coupling adapter 13. Adjacent the upper open end of flexible tubular means 11 are faucet adapter fasteners 35 and 35' which are the extensions of one strip of elongated flexible material affixed around the top of flexible tubular means 11. Located below the faucet adapter is a rubber hose stub 30 comprising rigid hose-threaded female coupling adapter 14, and depressed connecting collar 31 connecting the rigid rotatable female hose-threaded coupling adapter 14 to rubber hose stub 30 threaded at 37 and shown spirally twisted into an open female receiving end 32 of shower hose 33.

Flexible tubular means 11 should be made of natural or synthetic rubber or other suitable plastic material so that tubular opening 11' is flexible enough to fit over faucets of various sizes, and so that a flexible hose to which the adapter is attached can be moved about without breaking the connection between the adapter and the faucet. Thickness of the rubber used will depend on the pressure of the fluid being transported and the circumference of the faucet to which it will be attached. It has been found that a thickness of from about one thirty-second to three thirty-seconds inch and an internal diameter opening of from about ⅞ to about 1 ⅛ inches is suitable for most faucets. The tube should be reinforced by conventional internal means, by an outer netted sleeve or by taping or other suitable means to withstand water or fluid pressures which vary from about 25 to 40 lbs. in rural areas, to 30 to 100 lbs. in city areas. The reinforcement is also necessary for commercial or industrial use of the adapter device. The outer netted sleeve 12 can be made of twine, nylon, plastic or another suitable material and attached or affixed around the tube in a manner that will preserve tubular flexiblity. The reinforcement need only extend to a point near the neck of the tube where the tube will be covered and adequately reinforced by the faucet adapter fasteners that will be wound around the tube to secure the tube to a faucet.

Faucet adapter fasteners enumerated as 16 and 16' in FIGS. 1, 2 and 5 are nonreinforced flexible, elastic elongated taillike extensions of flexible tubular means 11. One end of the natural or synthetic rubber tube is cut at an angle to form the taillike extension of the tube that can be wrapped around the end of the tube itself, around the joint between the tube opening and the mouth of a faucet, and around a portion of the faucet itself. The fastener should be from about 10 to about 14 inches long and about one-half to about 1 inch wide so that enough turns can be made around the joint to make it watertight and secure.

Faucet adapter fasteners enumerated 35 and 35' in FIGS. 7 and 8 are the extensions of a one-piece elongated strip of flexible material. The flexible material can be natural or synthetic rubber, or other suitable plastic material. The one-piece strip is affixed to the flexible tubular means by an adhesive or other suitable means, adjacent flexible tubular opening 11'. As shown in FIG. 8, the strip can be affixed at or near the midpoint of its length, for a distance of about one-fourth to three-fourths the circumference of neck of the flexible tubular means. The single fastener strip may also be affixed at any point along its length. For example, it may be affixed adjacent one of its ends. In that case it would function similar to the nonreinforced elongated taillike extension 16 of flexible tubular means 11 in FIGS. 1, 2 and 5.

Whether the single fastener strip is affixed at its midpoint, adjacent one of its ends, or elsewhere, the fasteners should be of sufficient length i.e., from about 5 to 10 inches long, so that enough encirclements can be made to provide a watertight and secure joint, and so that a secure knot can be tied with the fasteners.

All of the faucet adapter fasteners shown in the drawings and enumerated in the specifications should be made either to have a middle ridge 20' as shown in FIG. 4 or to have affixed a compressible sealer 20 running lengthwise along the center and parallel to the edges of the fasteners. These act as gaskets providing an effective seal of a joint between a faucet adapter device and a faucet. Fastener 16' of FIG. 4, is molded so that its inner surface will have a builtin, tapered, middle ridge of natural or synthetic rubber that is about one-sixteenth to one-eighth inch high, whereas compressible sealer 20 of FIGS. 2 and 3, is a narrow elongated strip of flexible material running lengthwise along the center and parallel to the edges of fastener 6. Sealer 20 should be made of natural or synthetic rubber to allow it to expand and contract with fastener 16 as it is wrapped or unwrapped from around a joint, and it should be from about one-sixteenth to one-eighth inch the width of fastener 16 and about one-sixteenth to one-eighth inch high. However, these dimensions can vary depending on the thickness of the fastener and the amount of fluid pressure involved. The ridge or sealer can run the full length or any length of the fasteners but preferably neither should run for a distance of about 1 ½ to 2 ½ inches from the far end of the fasteners. This is to allow an adequate knot to be tied in the fasteners. (See FIG. 7).

Several means may be utilized to fasten and seal the faucet adapter fasteners. The preferred means shown in FIGS. 1, 2, 3 and 4, is to affix matching hook and loop nylon gripping material to the respective inner and outer surfaces of the fasteners such that when the fasteners are wound around a joint between the faucet adapter device and a faucet, hooks 19 will engage loops 18 and secure the fastener in place. The hook and loop material may be used with either a fastener having a compressible sealer 20 as in FIGS. 2 and 3, with a fastener having a middle ridge 20' as in FIG. 4, or with a fastener having neither a ridge nor a sealer.

Another means is to use the C-clamp clasping device 25 of FIG. 5. When a faucet adapter device of this invention is being attached to a faucet, and fastener 16 of FIG. 5 has been fully wound around the faucet, C-clamp clasping device 25 is clasped over the fastener wrappings thereby securing the fasteners to each other and to the faucet. The size, width and strength of the C-clamp device can vary. Preferably, it should be from about three-eighths to about 1 inch wide and from about 3 to 8 inches long. Its inside surface should be roughed, be coated with a coarse, gritty material, or have a coarse sand paper or similar material affixed to it to prevent slippage of the fasteners and to hold them securely in place. The C-clamp clasping device 25 is especially effective to hold fasteners exposed to soap suds or other slippery substances. It can be used with fasteners having hooks and loops, fasteners having a coarse, gritty material affixed to their inner surfaces, or fasteners having plain inner surfaces.

Rigid male hose-threaded coupling adapter 13 is a rigid metal or other suitable solid tubular structure affixed to the open end of flexible tubular means 11 opposite open end 11' where faucet adapter fastener 16 is affixed. The coupling adapter can be affixed by slipping the mouth of the flexible tube over and around the nonthreaded end of the coupling and gluing, taping or otherwise affixing the tube to the coupling. This coupling can be spirally connected to corresponding rigid female hose-threaded coupling adapters affixed to garden hoses, shower hoses, rubber hose stubs or other flexible hoses to provide a watertight secure connection between the faucet adapter device and flexible hose. This allows fluid to flow freely through a faucet to a movable hose without hose disconnection or leaking.

Coupling adapter 13 affixed to the open end of tubular flexible means 11 can be female such as is shown by 14 in FIG. 8. This would enable the adapter to be connected to male hose-threaded coupling adapters, or be affixed to a garden hose or other flexible hose.

Rubber hose stub 30 of FIGS. 7 and 8, is a natural rubber hose having a rigid rotatable female hose-threaded coupling adapter 14 affixed at one of its ends by means of a multifingered, depressed, metal collar connector 31, and having a threaded neck 37 adjacent its other end for connection with an open female threaded end 32 of shower spray hose 33. Rubber hose stub 30 should be made of natural or synthetic rubber, plastic or another substance hard enough to maintain its circumference and remain spirally connected to the female threaded end of a shower hose. The dimensions of the stub preferably should be from about 2 ½ to 6 inches in length, from about ¾ to about 1 ¼ inch in its outer diameter, and from about three-eighths to about five-eighths inch in its inner diameter, although these dimensions may be varied to fit the size of particular female shower hose openings.

Knobbed handle 29 of FIGS. 7 and 8, is a starlike, five-mounded structure carved out of a hardened plastic-steel malleable substance glued to and molded around rigid male coupling adapter 13 adjacent its hose-threaded neck. Knobbed handle 29 need not be as described above but can be any device or substance shaped or molded to facilitate the gripping and the handling of the adapter when spirally connecting it to faucets or flexible hoses.

MODE OF OPERATION OF THE INVENTION

The best mode of operating the faucet adapter device of this invention can be explained as follows: Taking the faucet adapter device of FIG. 2 and using its faucet adapter fastener in combination with C-clamp clasping device 25 as shown attached in FIG. 5, rigid hose-threaded male coupling adapter 13 is spirally connected to rigid rotatable female hose-threaded coupling adapter 14 as shown in FIG. 1. The faucet adapter device 11 is then attached to faucet 17 by taking the mouth 11' of the faucet adapter device and slipping it over and around faucet 17. Faucet adapter fastener 16 is then would around the joint between faucet adapter device 11 and faucet 17. Fasteners 16 and the joint are sealed watertight and secure when hooks 19 and the inside of fastener 16 engage outside loops 18 and when C-clamp fastener device 25 is clamped over and around the fastener wrappings on faucet 17.

I claim:

1. A faucet adapter device for flexibly connecting a pliable hose to a rigid faucet which comprises in combination, a reinforced flexible tubular means for transporting fluid between a rigid faucet and a pliable hose, said reinforced flexible tubular means having affixed adjacent one of its open ends, a rigid hose-threaded male coupling adapter for connection with a corresponding rotatable female coupling adapter affixed adjacent an end of a flexible hose, the other end of the device flexibly fitting over the end of the faucet and affixed adjacent said other end of said reinforced flexible tubular means, at least one faucet adapter fastener wherein said faucet adapter fastener is a nonreinforced, flexible, elastic, elongated, taillike extension of said flexible tubular means, the said taillike extension having a gasket means thereon for sealing in watertight relationship the joint between said faucet adapter device and a rigid faucet.

2. The faucet adapter device of claim 1 wherein each of said faucet adapter fasteners has matching hook and loop nylon gripping material affixed to its respective inner and outer surfaces, and each inner surface is tapered at its center so that a middle ridge about one-sixteenth to one-eighth inch high runs lengthwise and parallel to the edges of said fasteners and acts as a gasket for sealing the joint between said faucet adapter device and a rigid faucet when said fasteners are wound around said joint and secured by the interengaging hooks and loops.

3. The faucet adapter device of claim 1 wherein each of said faucet adapter fasteners has matching hook and loop nylon gripping material affixed to its respective inner and outer surfaces, and each fastener has about a one-sixteenth to one-eighth inch high compressible sealer running lengthwise along the center and parallel to the edges of said fasteners, said sealer being a narrow elongated strip of flexible material acting as a gasket for sealing he joint between said faucet adapter device and a rigid faucet when said fastener is wound around said joint and secured by the interengaging hooks and loops.

4. The faucet adapter device of claim 1 where the inner surface of each said faucet adapter fastener is coated with a coarse, gritty material for preventing slippage of said fastener, and attached adjacent the extremity of one or more of said fasteners is a C-clamp clasping device for securely clasping said fasteners to a rigid faucet, the inner surface of said clasping device being coated with a coarse, gritty material.

* * * * *